United States Patent [19]

Iwata

[11] Patent Number: 4,656,458
[45] Date of Patent: Apr. 7, 1987

[54] MOTION SENSOR

[75] Inventor: Keisuke Iwata, Tokyo, Japan

[73] Assignee: Iwata Electric Co., Ltd., Tokyo, Japan

[21] Appl. No.: 741,689

[22] Filed: Jun. 6, 1985

[30] Foreign Application Priority Data

Apr. 11, 1985 [JP] Japan .................................. 60-54147

[51] Int. Cl.$^4$ ............................................... B60R 25/10
[52] U.S. Cl. ...................................... 340/65; 340/689; 73/652
[58] Field of Search ............... 73/652, 654; 340/52 H, 340/65, 566, 689; 310/329; 200/61.45 M

[56] References Cited

U.S. PATENT DOCUMENTS 3,631,271 12/1971 Shimada ............................. 340/689
4,086,807 5/1978 Nakada .................................. 73/652
4,322,714 3/1982 Morgan ............................ 340/52 H

FOREIGN PATENT DOCUMENTS 13323 1/1982 Japan ..................................... 73/652

Primary Examiner—Stewart J. Levy
Assistant Examiner—John E. Chapman, Jr.
Attorney, Agent, or Firm—Robert E. Burns; Emmanuel J. Lobato; Bruce L. Adams

[57] ABSTRACT

Disclosed is a motion sensor for sensing movement of an object to be monitered, the motion sensor comprising a support disk having a concave upper surface, a ball rotatably put on the support disk, and a piezoelectric element attached on the support disk. If the object attached with the motion sensor inclines or swings, the ball rolls on the support disk to cause the support disk to vibrate. The vibration is taken out as an electric signal by the piezoelectric element and the electric signal informs of the fluctuation occured on the object. An electromagnet, upon energization, prevents rolling movement of the ball.

9 Claims, 3 Drawing Figures

U.S. Patent    Apr. 7, 1987    4,656,458
FIG. IA
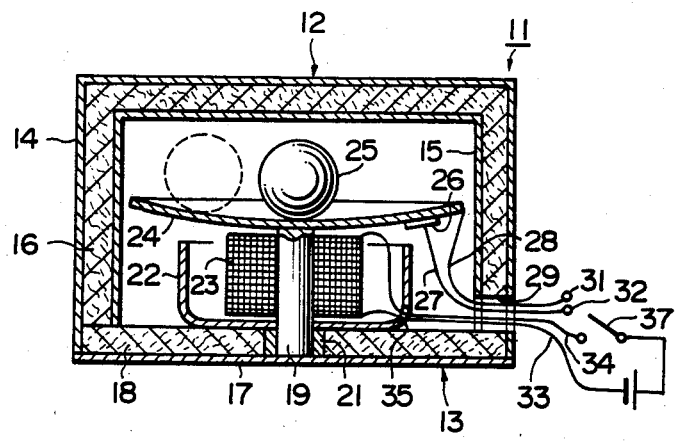
FIG. IB
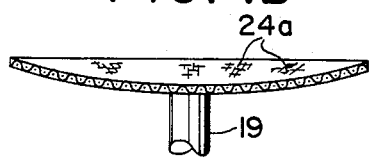
FIG. 2
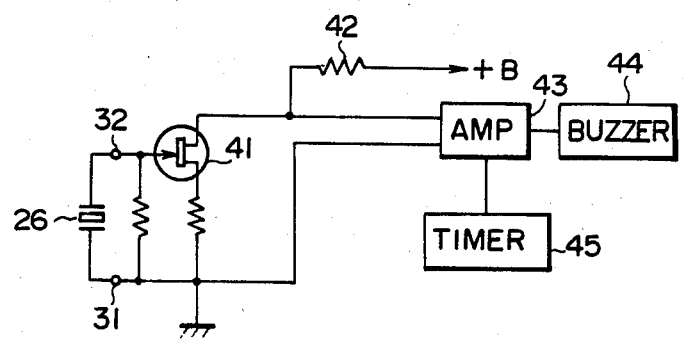

MOTION SENSOR

BACKGROUND OF THE INVENTION

The present invention relates to a device for sensing a motion of an object to be monitored, and particularly to a device for mechanically and electrically sensing a fluctuation such as inclination, swing, or the like, of an object to be monitored and detecting the fluctuation in the form of an electric signal.

For example, with respect to a parked car in which no one rides, there are possibilities of robbery of the car per se, robbery of a tire, rear-end collision by another car, mischief, etc. Conventionally, there has been provided a robbery-proof or anti-theft device attached on a car in its car body or trunk room for sensing a fluctuation such as inclination or swing of the car and for producing an alarm sound when the fluctuation is sensed. Such a robbery-proof device comprises an electrically conductive cantilever spring with one end thereof being fixed in a casing and with the other end thereof being attached with a weight, a contact attached at a middle portion of the cantilever spring, and a support member on which a fixed contact is attached at a position opposite to the first-mentioned contact with a predetermined distance therebetween. The car body is inclined or swung by a weight load of a trespasser into the car in case of robbery of the car per se, and by jacking up in case of robbery of a tire. The cantilever spring in the robbery-proof device is caused to vibrate by the inclination or swing of the car so that the contact attached to the spring intermittently comes in contact with the fixed contact. Upon contacting between the two contacts, an alarm device is operated to inform the owner of the car the robbery. In order to sense slight inclination or swing of the car body, however, it is necessary that the cantilever spring has sharp vibration resonance frequency characteristics. Therefore, there has been a defect that the contact between the two contacts can not be attained when an inclination angular speed, or the like, of the car is out of the frequency of natural vibration of the cantilever spring. Besides, the frequency of vibration of a car body varies depending not only on the kind of a car and the weight of load, but also on the weight of a transpasser. Therefore, it has been impossible to set the cantilever spring to operate in wide frequency range for all the kinds of inclination and swing.

SUMMARY OF THE INVENTION

An object of the present invention is to provide a motion sensor which can surely sense an inclining motion, a swinging motion, or the like, applied to an object to be monitored.

Another object of the present invention is to provide a motion sensor suitable as a robbery sensor for a car, for sensing any kind of vibration applied to the car body and for producing an alarm.

According to an aspect of the present invention, the motion sensor comprises a casing, a support disk received in the casing and having a concave upper surface, a spherical body rotatably disposed on the concave upper surface of the support disk, and a piezoelectric element attached on the support disk for converting a vibration of the support disk caused by the rotational displacement of the spherical body into an electric signal.

Preferably, the concave upper surface of the support disk may be constituted by a plate which is subject to satin finishing or by a plate meshed finely. Thus, when the support disk is inclined or swung, it is possible to produce the mechanical vibration caused by the spherical body which moves and rotates on the support disk. Preferably, the support disk may be provided with an electromagnet means at a center portion of the lower surface of the disk so that when the operation of the motion sensor is stopped, the electromagnet means is energized to thereby fix the spherical body on the support disk by the magnetism.

In the motion sensor according to the present invention, the spherical body can rotationally moves on the support disk to cause the support disk to vibrate upon slight inclination or swing of an object to which the motion sensor is attached. Besides, because the upper surface of the support disk is concave, the spherical body may rotationally move on the support disk when the object inclines even for a moment, and the rotational movement continues for a while even after the inclination and swing of the object stops. The vibration of the support disk can be surely detected by the piezoelectric element.

The above and other objects, featurs, and advantages of the present invention will be more apparent from the following description with respect to a preferred embodiment illustrated in the accompanying drawings.

BRIEF DESCRIPTION OF THE DRAWINGS

FIG. 1A is a vertical cross-section showing an embodiment of motion sensor according to the present invention used as a robbery sensor for a car together with an electric and magnetic circuit;

FIG. 1B is an enlarged cross-section of another embodiment of a support disk according to the present invention; and FIG. 2 is a circuit diagram showing an alarm circuit portion in FIG. 1A.

DETAILED DESCRIPTION OF PREFERRED EMBODIMENTS

In FIG. 1A, a motion sensor is generally designated by a reference numeral 11. The motion sensor 11 is provided with a cylindrical casing 12 having an opening at its lower end, and a cap 13 attached to the lower end opening of the casing 12 to close the same. The casing 12 is provided with an outer cylindrical portion 14, an inner cylindrical portion 15 disposed inside the outer cylindrical portion 14 with a predetermined gap therebetween, and a sound shielding member 16 filled in the gap between the outer and inner cylindrical portions 14 and 15. The cap 13 is provided with a circular substrate 17 and a sound shielding member 18 disposed on the substrate 17. The sould shielding members 16 and 18 are used for reducing noises due to external sound or the like. A cylindrical magnetic support 19 has a lower end fixed on the upper surface of the substrate 17 at its center portion. The upper end of the magnetic support 19 is disposed substantially at the middle portion of the inner cylindrical portion 15. A collar 21 having an axial length substantially equal to the thickness of the sound shielding member 18, is attached on the lower end of the magnetic support 19. A cylindrical member 22 having an upper end opening and a bottom is disposed so as to be supported at the center portion thereof by the collar 21. The cylindrical member 22 is comprised of magnetic material. A coil 23 is wound about the magnetic support 19 in the cylindrical member 22.

A support disk 24 having a concave upper surface is attached on the upper end of the magnetic support 19. Namely, the upper end of the magnetic support 19 is attached to the rear surface of the center portion of the support disk 24. A ball 25 made of a magnetic metal such as iron is rollably disposed on the support disk 24. The support disk 24 is composed of an electrically conductive metal plate, and preferably, the upper surface of the disk 24 is made rough, for example, by satin finishing so that the support disk is surely caused to vibrate by the rotatinal displacement of the ball 25. Alternatively, as shown in FIG. 1B, the support disk 24 may be constituted by a meshed plate having a large number of small meshes 24a each having a dimension much smaller than the diameter of the ball 25. Alternatively, the surface of the ball 25 per se may be made rough. A piezoelectric element 26 is attached on the rear surface of the support disk 24. One of the electrodes of the piezoelectric element 24 is connected to a lead wire 27 and the other is connected to a lead wire 28 through the support disk 24. The lead wires 27 and 28 extend outwardly from an opening 29 formed in the side wall of the casing 12 and are connected to terminals 31 and 32 respectively. Lead wires 33 and 34 of the coil 23 extend outwardly from an opening 35 formed in the cylindrical member 22 and through the opening 29 of the casing 12. The lead wires 33 and 34 are connected to a power source batery 36 and to a fixed contact of a switch 37 respectively. The switch 37 is provided for the purpose of energizing the coil 23, and is arraned such that, for example, it is linked with an ignition key (not shown) of a car whereby the switch 37 is turned on when the ignition key is turned on.

As shown in FIG. 2, one of the electrodes of the piezoelectric element 26 is connected to the earth or ground and the other is connected to a gate of a field effect transistor 41. A source of the field effect transistor 41 is earthed and a drain of the same is connected to the power source through a load resistor 42. An amplifier circuit 43 is connected between the drain and the source of the field effect transistor 41, so as to detect and amplify a voltage change produced at the drain of the transistor 41. The output of the amplifier circuit 43 is connected to a buzzer circuit 44 which generates a buzzer alarm sound in response to the output of the amplifier circuit 43. A timer circuit 45 is connected to the amplifier circuit 43. The timer circuit 45 is linked with the switch 37 for the ciol 23, and causes the amplifier circuit 43 to operate after a predetermined time, for example 60 second, which has counted from the turn-off of the switch 37. The timer circuit 45 is linked with a door key of a car so that it is turned off when the door key is unlocked. The timer circuit 45 may be linked with the door key such that the operation of the timer circuit 45 may start when the door key is locked.

Next, the operation will be described. Assume that the motion sensor 11 according to the present invention is attached on a body, a trunk, or the like, of a car with the upper surface of the support disk 24 facing up. Upon unlocking of the door key, the timer circuit 45 is turned off. Next, if the ignition key is turned on, the switch 37 linked with the ignition key is turned on and the coil 23 is energized. Because the coil 23 is energized, a magnetic field is generated so that the magnetic support 19 is magnetized, and a magnetic circuit passing through the cylindrical member 22 is formed so that the ball 25 is magnetically fixed or held on the support disk 24 at a portion corresponding to the upper end portion of the magnetic support 19. Therefore, it is possible to prevent the ball 25 from rotating due to swing, shock, or the like, while a car is running, thereby preventing noises from being generated and preventing the support disk 24 from being worn or injured. In this embodiment, the support disk 24 is made of a suitable non-magnetic material.

Upon turning the ignition key off when the car stops in a garage or in a parking lot, the switch 37 is turned off and the coil 23 is deenergized, so that the ball 25 becomes able to freely roll or rotate on the support disk 24. The timer circuit 45 operates in response to the turning-off of the ignition key or the locking of the door key and causes the amplifier circuit 43 to operate after the predetermined time has been elapsed. Therefore, the buzzer circuit 44 never operates even if the ball moves rotationally on the support disk 24 in response to the swing of the car generated when the operator gets out of the car.

In case someone tampers with the car, opens the door to steal something, or jacks up the car to steal the tire, the ball 25 starts to roll on the support disk 24 by the slight inclination of the car. Because of the concave shape of the upper surface of the support disk 24, the ball 25 is caused to return to the former position after it reaches the peripheral edge of the support disk 24 and caused to further run to the opposite peripheral edge portion so that the rotatory movement of the ball 25 becomes attenuated while repeating the reciprocating movement and the ball 25 stops at last. The support disk 24 is caused to vibrate by the rolling of the ball 25 and the vibration is detected by the piezoelectric element 26 in the form of an electric signal. In response to the electric signal of the piezoelectric element 26, the buzzer circuit 44 operates to generate an alarm sound. The alarm sound continues until the timer circuit 45 is turned off. The timer circuit 45 is turned off by unlocking the door key as described above.

Although the alarm sound is generated by the buzzer circuit 45 in the foregoing embodiment, the motion sensor may be arranged, alternatively, such that an transmitting circuit is actuated to send an alarm signal to a receiver set carried by the operator of the car, instead of the buzzer circuit 45. Further, although the ball 25 is fixed during the unused period by the electromagnet in the foregoing embodiment, the ball may be fixed by pressing means arranged to mechanically press the ball 25 downwardly or laterally. In that case, it is not always necessary to make the ball 25 with iron but the ball may be made of, for example, such as brass. Further, the motion sensor may be arranged such that the piezoelectric element 26 is prevented from producing its output upon turning the ignition key on whereby the motion sensor never operates during the period of normal use. Besides, the piezoelectric element 26 may be covered with a suitable protector so that the piezoelectric element 26 may be attached on the upper surface of the support disk 24.

As described above, the motion sensor according to the present invention can sense surely a fluctuation produced in an object on which the motion sensor is mounted even if the object slightly inclines or swings. Therefore, the motion sensor according to the present invention can be ulitized not only for a robbery sensor or anti-theft sensor for a car as described above as a preferred embodiment but also for a device for sensing a fluctuation produced in various kinds of objects.

While the present invention has been particularly shown in the drawings and described with reference to a preferred embodiment thereof, it will be obvious for those skilled in the art that the various changes in form and details can be made therein without departing from the spirit and scope of the present invention.

What is claimed is:

1. A motion sensor comprising: a casing; a support disk composed of non-magnetic material disposed in said casing and having a concave upper surface; a spherical body composed of magnetic metal and rotatably disposed on said concave upper surface of said support disk; a piezoelectric element attached on said support disk for converting a vibration of said support disk caused by rotational displacement of said spherical body into an electric signal; and electromagnetic means provided in said casing for supporting said support disk at a center portion of the lower surface thereof and for magnetically fixing said spherical body on said support disk upon energization of said electromagnetic means.

2. A motion sensor according to claim 1, in which said concave upper surface of said support disk has a rough surface.

3. A motion sensor according to claim 1, in which said support disk comprises a mesh plate provided with meshes thereon, each of the meshes having a dimension smaller than a diameter of said spherical body.

4. A motion sensor according to claim 1, further comprising a cylindrical member disposed in said casing and housing said electromagnetic means therein, said cylindrical member forming a magnetic circuit when said electromagnetic means is energized.

5. A motion sensor according to claim 1, in which a sound shielding material is provided on an inner circumferential surface of said casing.

6. A motion sensor comprising: a casing; supporting means mounted to undergo vibration within said casing and having a concave upper surface; a spherical body composed of magnetic material and rollably disposed on said concave upper surface to undergo rolling movement therealong in response to motion of the casing to thereby effect vibration of the supporting means; a piezoelectric element attached to said supporting means for converting the vibration of said supporting means caused by rolling movement of said spherical body into an electric signal; and electromagnetic means disposed in said casing for magnetically holding said spherical body on said concave upper surface to prevent rolling movement thereof upon energization of said electromagnetic means.

7. A motion sensor according to claim 6, further comprising an electric circuit for receiving the electric signal and for transducing the electric signal into an alarm sound signal.

8. A motion sensor according to claim 7; wherein the electric circuit includes a timer for setting an operation interval of the electric circuit.

9. A motion sensor according to claim 6; wherein the electromagnetic means includes a magnetic support connected to the underside of the supporting means to support the same within the casing, and an energizable coil disposed around the magnetic support and coacting therewith when energized to magnetically hold the spherical body on the concave upper surface.

* * * * *